Oct. 17, 1967  R. N. STEENSEN  3,347,391
FILTER CARTRIDGE AND METHOD OF MAKING THE SAME
Filed Oct. 29, 1964
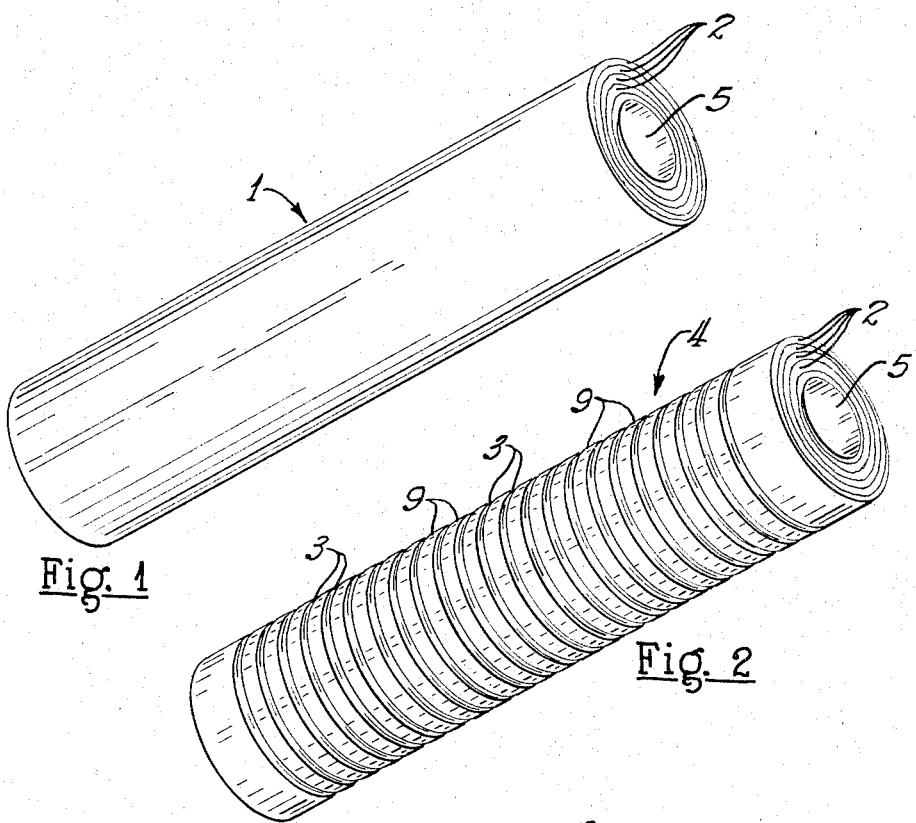
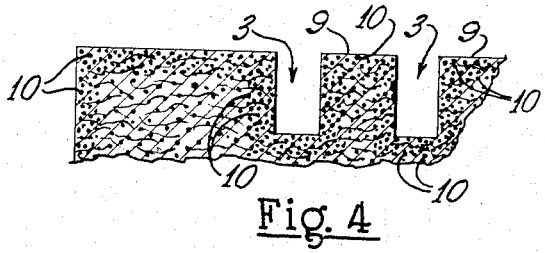
Fig. 4
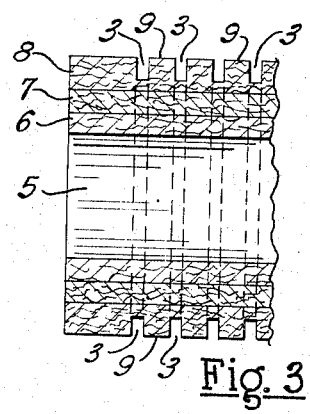
Fig. 3
INVENTOR:
ROBERT N. STEENSEN.
BY
ATTORNEYS

United States Patent Office 3,347,391
Patented Oct. 17, 1967

3,347,391
FILTER CARTRIDGE AND METHOD OF
MAKING THE SAME
Robert N. Steensen, Newark, Ohio, assignor to Owens-Corning Fiberglas Corporation, a corporation of Delaware
Filed Oct. 29, 1964, Ser. No. 407,399
8 Claims. (Cl. 210—491)

ABSTRACT OF THE DISCLOSURE

A liquid filter composed of layers of a fibrous material impregnated with a hardenable resin. The filtering efficiency or porosity of the filter may be graduated in the direction of liquid flow by progressively varying the density or diameter of the fibrous material in the layers making up the filter body. To increase resistance to surface clogging, grooves or irregularities are provided on exposed surfaces to increase surface area. Additional amounts of resin binder to give increased mechanical strength and reduce media migration may be added by post-dipping the initially formed filter in a resin bath. The method of making such filters includes the steps of applying the additional curable resin and curing the added curable resin after the grooves have been formed in the surfaces of the filter body.

---

The present invention relates to a filter cartridge for removing liquid and solid contaminants from a fluid within a closed filter system. More particularly, the present invention relates to a new and improved filter cartridge comprised of a resin impregnated fibrous material which is particularly suited for removing liquid and solid contaminants from liquid fuel, such as gasoline, and solid contaminants from water in water purification systems. Other contemplated applications include filtration of industrial fluids such as paint resins, coolants, cutting oils and the like.

It has long been recognized that disposable filter cartridges comprised of a resin impregnated fibrous material, such as glass fibers, are particularly desirable because of their low cost and ease of manufacture and their high efficiency in removing solid and liquid contaminants from liquid fuels such as gasoline. Such filters are also useful in the purification of water in small capacity water purification systems. The filtering efficiency of a filter comprised of a resin reinforced fibrous material is proportional to the number and size of the spaces or voids between the intersections of the various fibers.

A filter cartridge having a high degree of filter efficiency may be comprised from a fibrous material such as glass fibers wherein the fibers are of a relatively small diameter, so that for a given filter weight, the number of individual fibers is relatively large and thus presents a relatively large number of intersections which decreases the size of the spaces through which solid or liquid contaminants may pass. On the other hand, if a filter having a lower filter efficiency is desired, the fibrous material, such as glass fibers, may be comprised of fibers having a relatively larger diameter so that, for a given filter weight, the number of fibers and intersections is relatively small and therefore the size of the spaces between these fibers and intersections is relatively large.

In certain filter applications, particularly in filtering water, it has been found desirable to use a single unitary filter cartridge having a variable filter efficiency throughout. Since the size of the contaminating particles, particularly in a water system, may vary greatly, a variable density filter cartridge has been found to be extremely useful since it is capable of filtering a fluid having various size contaminants to a high degree of purification. If the fibers in a variable density filter are so arranged that the contaminated fluid passes through the least dense portions of the filter first, the largest contaminant particles are retained in the least dense filter areas and, as the water continues to penetrate the filter, the smaller particles are retained in the more dense areas of the filter and so on. Such filters have been found to be preferable to a single high density filter because larger contaminant particles which contact the surface of the high density filter may completely plug or fill the small spaces or voids between intersections of the fibers. This, of course, necessitates either replacement of the filter at frequent intervals or a backwashing process to remove the larger particles on the outside of the filter. A backwashing or reverse flow process may be impractical in certain small installations and, of course, increases the operating cost of the filtering system.

To further increase the efficiency and service life of variable density filters, as described above, when used in systems having solid contaminants of greatly varying sizes, it has been found desirable to increase the surface area of the least dense areas of the filter because the contaminated fluid which first passes through this surface will deposit the largest contaminated particles upon the surface. An increased surface area will increase the life of the filter cartridge since the increased surface can collect and retain a larger amount of large particles of contaminant. One method suitable for hollow cylindrical filter cartridges wherein the filtrate flows from the outer surface radially inward is to cut or mold a series of grooves or notches in the outer surface. This method of increasing the surface area, and therefore the filter efficiency and service life, is particularly suited to resin reinforced fibrous filters which, after they have been formed in a hollow cylindrical shape, may be grooved or notched by a series of circumferential cuts or turned on a machine tool to produce a spiral groove configuration in the outer surface.

One disadvantage of resin reinforced, cylindrical fibrous filters having grooved surfaces to increase the surface area is that the grooves, which create circular lands or flanges between them, substantially weaken the physical strength of the filter. Although it is desirable to provide as many grooves in the outer surface of the hollow filter cartridge as is possible to increase the area of the outer surface, the number of grooves which practically may be used is limited by the physical strength of the outer layer of the filter. Too many grooves in a given length of the cartridge will create lands or flanges between them which are not thick enough to support themselves or to resist any minor blows without breaking off. This is particularly true in filters in which the outer surface in which the grooves are cut is comprised of relatively large fibers having relatively few intersections of the fibers in the flanges or lands. Since the larger fibers have fewer intersections, there are fewer points at which the resin can bond the fibers together to produce high physical strength and the flanges or lands are correspondingly weak and subject to breakage.

Furthermore, in producing a variable density filter in which a high density inner layer composed of relatively small diameter fibers is adjacent an outer layer of relatively large diameter fibers, it is impossible to increase the physical strength of the outer layer to prevent breakage of the flanges or lands by initially increasing the amount of resin in the filter. Because the resins which are used to bind the fibrous material together must, of course, be insoluble in the liquid to be filtered, a high resin concentration which would be satisfactory to give additional strength to the outer, less dense layer, might be unsatisfactory in the inner, more dense layer because it would substantially fill the spaces between the fibers in the dense inner layer and thus reduce or stop all passage of liquid through the filter. Therefore, prior to this invention, the number of grooves in the outer layer has been limited by the physical strength of the flanges or lands between the grooves of the outer layer, which could not be substantially increased by initially increasing the resin concentration due to the fact that such an increased resin concentration would adversely affect the filtering efficiency of the entire filter cartridge.

Furthermore, prior to this invention, machined grooves on the outer surface of a filter cartridge have been found to be undesirable in certain filtering applications, due to the fact that the machining process, which must be done after the resin binder has been cured, necessarily disturbs the outer surface of the filter and causes small particles of fibrous materials and resin to be knocked loose. These particles, which adhere to the outer surface of the filter, may work loose and, as fluid flows through the filter, the loose particles may work themselves into the interior part of the filter and clog its small liquid passages. This problem of "media migration" is present regardless of the type of machining operation which is used to cut or turn the grooves in the outer surface of the filter.

Accordingly, it is an object of this invention to provide a high efficiency filter cartridge for use in filtering fluids containing contaminants of variable sizes in which the surface area of the filter is increased by cutting or turning grooves to more efficiently prevent larger particles from entering the filter itself, and wherein the outer surface is of increased physical strength and is free of loose particles of fiber and hardened resin.

It is another object of this invention to provide a filter cartridge of resin reinforced glass fibers having a variable density throughout, and having a grooved outer surface to provide an increased surface area for preventing large contaminant particles from entering the filter, and having an increased resin density in the area of the grooved surface to increase the physical strength thereof.

It is still another object of this invention to provide a method of producing a resin reinforced glass fiber filter having a grooved outer surface to provide an increased area for preventing larger contaminant particles from entering the interior of the filter, wherein the outer surface is reinforced by an increased resin concentration which does not adversely affect the filtering characteristics of the inner core of the filter.

It is yet another object of this invention to provide a method of producing a filter cartridge of a resin reinforced fibrous material having a grooved outer surface wherein the grooves may be machined and wherein the grooved filter is subject to substantially no media migration.

Other objects and advantages of this invention will be apparent in the following specification and drawings in which:

FIGURE 1 is a view in perspective of a hollow cylindrical filter cartridge having a smooth outer surface, said filter formed by spirally wrapping layers of a resin impregnated fibrous material upon a mandrel;

FIGURE 2 is a view in perspective of the hollow cylindrical filter cartridge of FIGURE 1 showing the grooves on the outer surface after machining;

FIGURE 3 is a partial cross sectional view of a grooved, hollow cylindrical filter cartridge having a variable filtering density; and FIGURE 4 is a partial cross sectional view, greatly expanded, showing a part of the outer grooved surface of a filter cartridge of this invention, and schematically showing the increased resin density in this outer surface.

A hollow cylindrical filter cartridge 1, as shown in FIGURE 1, is formed by rolling or laying up layers of a resin impregnated fibrous material, such as glass fibers, upon a mandrel to form the cylindrical cartridge. Layers of fibrous material, indicated by reference numeral 2, are spirally wrapped around the mandrel to give the hollow cylindrical shape.

Appropriate binders for use in glass fiber filters are well known in the art and are preferably thermosetting and insoluble in the fluid media which is to be filtered. Suitable binders such as phenolic, epoxy, melamine, and polyester resins may be used. After the hollow cylinder 1 has been formed to the desired shape, the resin is cured to give the hollow cylindrical cartridge rigidity and ability to withstand the machining process which forms the grooves, as shown in FIGURE 2.

The outer surface of the hollow cylinder has axially spaced grooves 3, which increase the outer surface area of the filter. A grooved hollow cylindrical filter cartridge 4, shown in FIGURE 2, is of the type to be used in a filtering system in which the liquid to be filtered flows from the outer surface of the grooved hollow cylinder 4, through the wall of the hollow cylinder, and into the hollow core 5. The purpose of the grooves 3 is, of course, to provide a large surface area for catching the large particles of contaminant and preventing them from entering the inner core of the filter where they may plug or stop up the spaces between the intersections of the fibers. It is to be understood that in filters adapted for use in a filtering system wherein the fluid flow is from the interior of the filter through the wall of the cylinder to the outside, the grooves would be provided on the inner cylinder surface. For purposes of illustrating this invention, a hollow cylindrical filter having a grooved outside surface is described.

FIGURE 3 is a partial cross section of a preferred species of a hollow cylindrical filter cartridge having a grooved outer surface as illustrated in FIGURE 2 and having a variable filter density. The innermost layer of the filter 6 is comprised of a fibrous material, of a relatively small diameter and relatively high filter efficiency. Adjacent to the layer 6 is an intermediate layer 7 comprised of a fibrous material of intermediate diameter and having an intermediate filter efficiency. On the outside of the intermediate layer 7 is an outer layer 8 comprised of a fibrous material having a relatively large fiber diameter and relatively low filter efficiency.

A filter having a variable filter efficiency throughout its cross section may also be formed by varying the tightness or degree of compacting of a single sheet of fibrous material as it is spirally wound to form a cylindrical filter body. A combination of the two methods is also possible.

As previously explained, the purpose of a variable density filter, as illustrated in FIGURE 3, is to provide an outer layer 8 for filtering the large contaminant particles and one or more inner layers 6 and 7 for progressively filtering the smaller particles. The outer layer 8 acts to prevent the larger particles from reaching the inner layers 6 and 7 where they may completely plug up the fluid paths between the fibers. As previously explained, the grooves 3 in the outer layer 8, shown in FIGURE 3, increase the surface area of the outer layer 8 and thus increase the efficiency and service life of the filter by providing additional surface area for preventing the largest contaminant particles from entering the interior of the filter where they may completely plug the fluid passageways.

As previously explained, prior to this invention, it has been found necessary to limit the number of grooves 3 in the outer surface 8 of the filter cartridge 4 due to the fact that the annular flanges or lands 9 formed between the grooves 3 may break off or collapse during the handling of the filter cartridge prior to its insertion in its housing. Furthermore, the machining process, which must be performed after the resin in the cylindrical filter 1 has been cured, causes minute particles of fiber and resin to break off and adhere to the outer surface. To overcome these disadvantages in grooved cartridge filters, the improved filter cartridge of the instant invention is produced by a further step of "post-dipping" the outer surfaces or layers 8 of the filter cartridge in a resin bath to further saturate the outer surfaces. The resin picked up by the outer surfaces 8 is then cured to produce a filter cartridge in which the outer surfaces, including the lands or annular flanges 9, contain an increased resin density and are, therefore, further rigidified against breakage. It may be desirable in certain applications to increase the resin density throughout the body of the filter by completely immersing it in the resin bath and saturating it with resin throughout its cross section.

As seen in FIGURE 4, the areas of increased resin density in the preferred embodiment, which are diagrammatically shown and indicated by reference numeral 10, extend into the lands or annular flanges 9 and inwardly into the filter body itself. This increased concentration of resin, of course, strengthens the lands or flanges 9 formed between the grooves 3 and enables them to resist forces parallel to the axis of the filter cartridge without breaking. This makes possible a filter having a larger number of closely spaced grooves 3. As previously explained, a larger number of grooves 3 in the outer surface of the filter cartridge increases the surface area of the filter which increases its efficiency and service life.

In producing filters of uniform filter efficiency composed of a single grade of fibrous material, it may be desirable to completely immerse the grooved filter in the resin bath so as to increase the resin density throughout. Since the grooved filter is immersed in the resin bath after the grooves are cut, the problem of media migration, as explained previously, is eliminated since the resin from the resin bath, after post-curing, will prevent the small pieces of fiber and cured resin from detaching themselves from the outer surface of the filter. The amount of resin picked up by the filter in the resin bath may be increased, if desired, by placing a vacuum in the hollow mandrel upon which the filter cartridge was formed during the "post-dipping."

In producing a filter having a variable density gradient, as shown in FIGURE 3, it is desirable to immerse only the outer layer 8 in the resin bath so that the increased resin density is only throughout the outer layer 8. As previously explained, complete immersion of a filter of variable density may not be desirable, because the increased resin concentration would tend to partially or completely block the passages between the fibers in the innermost layer 6 and disturb the high efficiency of this layer of the filter.

It will be apparent that without utilizing the method of this invention of immersing the outer layer of the filter in a resin bath after the grooves 3 have been machined, it is impossible to produce a variable density filter having outer areas 10 of increased resin density which increase the strength of the outer layer 8 without also impairing the filter efficiency of the inner, higher efficiency filter layer 6. Thus, the invention herein described has made possible the production of a high efficiency filter cartridge of variable density, wherein the inner layers of fibrous material may be selected from a very fine fibrous material and the outer layers may be selected from a very coarse fibrous material and yet be sufficiently rigid to withstand inadvertent bumping or blows without deteriorating or breaking of the lands or grooves between the cuts in the outer surface.

Furthermore, through the use of the applicant's improved process, a filter cartridge having a grooved surface for increasing the surface area may be provided wherein the problem of media migration caused by the machining process subsequent to the curing of the cylindrical filter is eliminated, since the "post-dipping" adheres all small particles of fibrous matter and resin to the outer surface and prevents them from entering the filter or from dropping into the filter cartridge housing.

It has also been discovered that the post-dipping process of this invention is useful in the manufacture of many types of products of fibrous materials, particularly where such a product is machined for close dimensional tolerance after being initially formed and cured. The post-dipping process and subsequent cure are effective to increase the dimensional stability of such products and also to adhere the undersirable loose particles from the machining operation. A higher concentration of resin is attained by the post-dipping process because the cured resin initially present provides an increased area for adhering the resin picked up in the post-dipping process.

It will be apparent that various changes and modifications can be made in the specific details discussed above and described in the example without departing from the spirit of the attached claims.

What I claim is:

1. A hollow cylindrical variable density filter cartridge, comprising, a plurality of concentric hollow cylinders of a resin impregnated fibrous material, axially spaced, radially extending circumferential lands on the outer surface of the outermost cylinder separated from one another by grooves therebetween, said cylinders comprised of fibers of a different size and having different filtering efficiencies, said cylinders arranged such that the filtering efficiency of said cartridge increases in a radially inward direction, said resin being uniformly distributed throughout the inner cylinders, and a porous resin layer on said outermost cylinder of a density greater than said uniformly distributed resin, said porous layer extending over said outer surface and the faces of said radial grooves and lands in said outermost cylinder.

2. A filter cartridge comprising a hollow cylindrical body of a resin impregnated fibrous material, said resin in said body being uniformly distributed throughout said body, axially spaced apart, radially extending circumferential lands on the outer surface of said body separated from one another by grooves therebetween, and a porous resin layer on said outer surface of a density greater than said resin in said body, said porous layer extending over said outer surface and the faces of said lands and grooves in said outer surface of said body.

3. A method of producing a hollow cylindrical filter cartridge of a resin impregnated fibrous material having spaced apart, radially extending circumferential lands throughout its outer surface separated from one another by grooves therebetween, said method comprising the steps of (1) forming a cylindrical filter body of a curable resin impregnated fibrous material upon a mandrel, (2) curing the resin in said filter body, (3) forming said circumferential lands on said outer surface of said cured filter body, (4) dipping the grooved filter body in a resin bath, (5) post-curing said grooved filter body to form a hardened porous layer of increased resin-density on the outer surfaces of said lands and grooves and cartridge, and (6) removing said mandrel.

4. The method of claim 3 including the step of applying a vacuum inside a hollow mandrel, causing the resin in said resin bath to substantially permeate the outer layer of said grooved body when said outer surface of said body is immersed in said resin bath.

5. A method of producing a variable density, hollow cylindrical filter cartridge of resin impregnated fibrous material, said cartridge having a plurality of concentric layers each comprised of a fibrous material having a different filtering efficiency, said layers arranged such that said filtering efficiency of successive layers increases in a radially inward direction, said outer layer having a plurality of spaced apart, radially extending circumferential lands on its outer surface separated from one another by grooves therebetween, said method comprising the steps of: (a) building up upon a mandrel successive layers of decreasing filter efficiency of a fibrous material uniformly impregnated with a curable resin, (b) curing said resin to form a cylindrical cartridge body having resin impregnated layers of a fibrous material of a variable filter efficiency, (c) machining circumferential, spaced-apart lands in the outer surface of said cartridge body, (d) immersing the outer surfaces of said grooved body in a bath of uncured resin, (e) post-curing said grooved filter cartridge to form a hardened porous layer of increased resin density on the outer surface of said grooves and said outer layer, and (f) removing said mandrel.

6. A hollow cylindrical filter cartridge, comprising, a plurality of concentric hollow cylinders of a resin impregnated fibrous material, axially spaced, radially extending lands separated from one another by grooves therebetween on the exposed surface of the cylinder having the least filter efficiency, said cylinders comprised of fibers of a different size and having different filter efficiencies, said cylinders arranged such that the filtering efficiency of said cartridge increases in a radial direction away from said grooved surface of said least efficient cylinder, said resin being uniformly distributed throughout the cylinders, and a porous resin layer on said grooved surface of a density greater than said uniformly distributed resin, said porous layer extending over said surface and the faces of said grooves and lands.

7. A method of producing a hollow cylindrical filter cartridge of a resin impregnated fibrous material having spaced apart, radially extending circumferential lands throughout its outer surface separated from one another by grooves therebetween, said method comprising the steps of (1) forming a cylindrical filter body of a fibrous material impregnated with a curable resin upon a mandrel, (2) curing the resin in said filter body, (3) forming said circumferential lands in said outer surface of said cured filter body, (4) immersing of the grooved filter body in a resin bath, (5) post-curing said filter body, and (6) removing said mandrel.

8. A method of producing a filter cartridge of a resin impregnated fibrous material having shaped convolutions on at least one exposed surface thereof, said method comprising the steps of (1) forming a filter body of a fibrous material impregnated with a curable resin, (2) curing the resin in said filter body, (3) forming said shaped convolutions on said exposed surface of said filter body, (4) immersing the body in a resin bath, and (5) post-curing said filter body.

References Cited
UNITED STATES PATENTS

| | | | |
|---|---|---|---|
| 2,217,085 | 10/1940 | Wheeler | 264—139 X |
| 2,395,301 | 2/1946 | Sloan | 210—508 X |
| 2,539,768 | 1/1951 | Anderson | 210—496 |
| 2,681,599 | 6/1954 | Palese et al. | |
| 2,768,754 | 10/1956 | Briggs | 210—496 |
| 2,781,913 | 2/1957 | Thompson | 210—496 X |
| 3,096,230 | 7/1963 | Briggs | 210—508 X |
| 3,156,648 | 11/1964 | Brucken et al. | 210—503 X |
| 3,261,473 | 7/1966 | Riede | 210—491 X |

FOREIGN PATENTS

| | | |
|---|---|---|
| 927,593 | 5/1947 | France. |
| 572,899 | 10/1945 | Great Britain. |

REUBEN FRIEDMAN, *Primary Examiner.*

D. M. RIESS, *Assistant Examiner.*